United States Patent
Pohl et al.

(10) Patent No.: US 9,403,558 B1
(45) Date of Patent: Aug. 2, 2016

(54) ENGINE MOUNT ASSEMBLY

(71) Applicant: GM GLOBAL TECHNOLOGY OPERATIONS LLC, Detroit, MI (US)

(72) Inventors: Kevin J. Pohl, Farmington Hills, MI (US); Kenneth J. Hsu, West Bloomfield, MI (US); William A. Morris, Troy, MI (US); Frederick M. Marquardt, Commerce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/713,487

(22) Filed: May 15, 2015

(51) Int. Cl.
*F16B 43/00* (2006.01)
*B62D 25/08* (2006.01)
*B62D 27/02* (2006.01)

(52) U.S. Cl.
CPC .............. *B62D 25/085* (2013.01); *B62D 27/02* (2013.01); *F16B 43/00* (2013.01)

(58) Field of Classification Search
CPC ...... B62D 25/085; B62D 25/07; B62D 25/24; B62D 27/02; F16B 43/00; F16B 43/004; F16B 43/005; F01D 25/32
See application file for complete search history.

(56) References Cited

U.S. PATENT DOCUMENTS

| | | | | |
|---|---|---|---|---|
| 4,230,324 A | * | 10/1980 | Derman | F16J 15/40 277/351 |
| 5,215,113 A | * | 6/1993 | Terry | F16K 17/30 137/460 |
| 2013/0034377 A1 | * | 2/2013 | Friedow | F16B 5/0241 403/23 |
| 2013/0322988 A1 | * | 12/2013 | Handa | F16B 31/028 411/531 |
| 2015/0176434 A1 | * | 6/2015 | Gerend S | F23R 3/002 411/531 |
| 2015/0219521 A1 | * | 8/2015 | Clew | G01M 3/223 72/31.01 |
| 2015/0233273 A1 | * | 8/2015 | Kida | F01M 11/0004 123/195 C |

\* cited by examiner

*Primary Examiner* — Drew Brown
(74) *Attorney, Agent, or Firm* — Quinn Law Group, PLLC

(57) ABSTRACT

An engine mount assembly includes a frame member and a cradle member. The frame member defines a frame hole and the cradle member defines a cradle hole. A bolt fixedly mates the frame member to the cradle member. The bolt has a bolt body, which is disposed within the frame hole and the cradle hole, and a bolt flange oriented downward relative to the vehicle. A well is defined by the frame hole or the cradle hole. The well is a volume around the bolt body capable of retaining water in contact with the frame member and or cradle member. A washer, having an interior hole and a perimeter edge, is disposed between the bolt flange and the well. At least one channel is defined in the washer and provides fluid communication between the well and the perimeter edge.

12 Claims, 2 Drawing Sheets

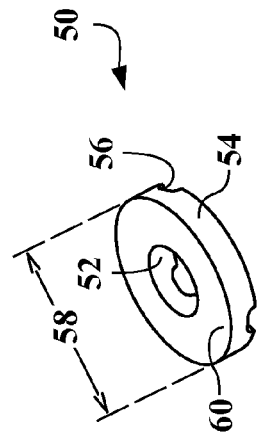
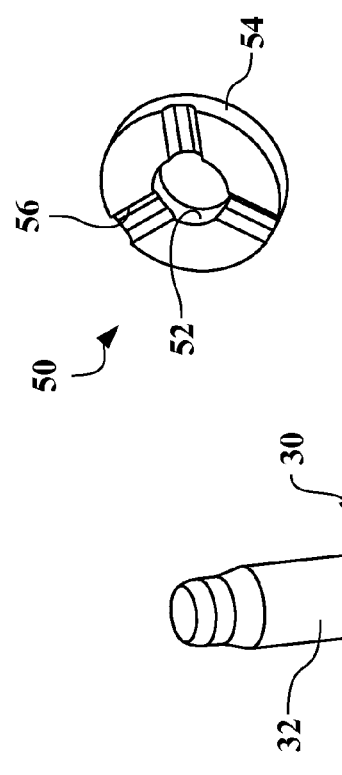
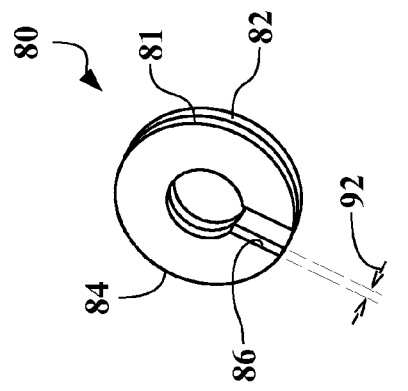
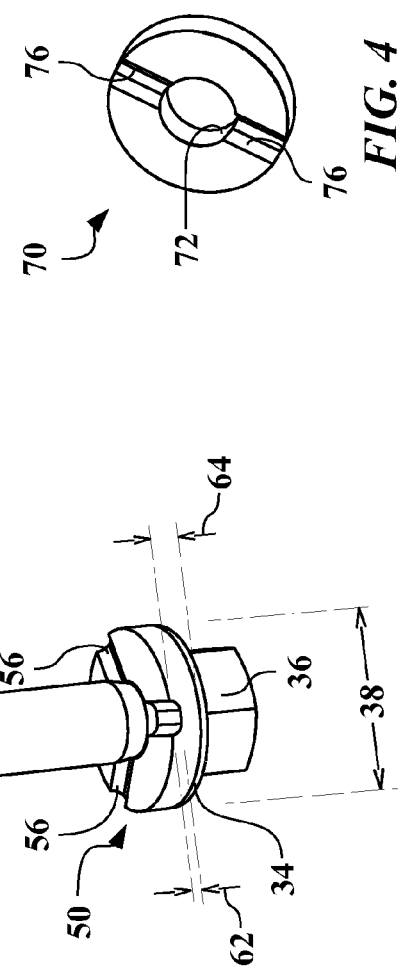

US 9,403,558 B1

ENGINE MOUNT ASSEMBLY

TECHNICAL FIELD

This disclosure generally relates to a cradle assembly that is attachable to a vehicle.

BACKGROUND

Many vehicles include a cradle or sub-frame mounted to an underbody of the vehicle. The cradle is often located beneath a powertrain at a front end of the vehicle, and provides attachment between the powertrain and the underbody.

SUMMARY

An engine mount assembly for a vehicle is provided. The engine mount assembly includes a frame member and a cradle member. The frame member is rigidly attached to a frame of the vehicle and defines a frame hole. The cradle member defines a cradle hole, which is substantially aligned or coincident with the frame hole.

A bolt is at least partially disposed within the frame hole and the cradle hole and fixedly mates the frame member to the cradle member. The bolt has a bolt body oriented upward relative to gravity or the top of the vehicle and a bolt flange oriented downward.

A well is defined by at least one of the frame hole and the cradle hole. The well is a volume around the bolt body that is capable of retaining water in contact with the bolt body and either the frame member or the cradle member (or both).

A washer, having an interior hole and a perimeter edge, is disposed between the bolt flange and the well. At least one channel is defined in the washer. The channel provides fluid communication between the well and the perimeter edge of the washer, such that fluid trapped within the well may be moved or drained to the perimeter edge and away from the well.

The above features and advantages, and other features and advantages, of the present subject matter are readily apparent from the following detailed description of some of the best modes and other embodiments for carrying out the disclosed structures, methods, or both.

BRIEF DESCRIPTION OF THE DRAWINGS

FIG. 2 is a schematic, isometric view of a bolt and washer for the engine mount assembly shown and described in FIG. 1;

FIG. 3A is a schematic, isometric view of a channel side of the washer illustrated in FIGS. 1 and 2;

FIG. 3B is a schematic, isometric view of a planar side of the washer illustrated in FIGS. 1 and 2;

FIG. 4 is a schematic, isometric view of a two-channel washer for the engine mount assembly shown and described in FIGS. 1 and 2; and FIG. 5 is a schematic, isometric view of a stacked washer for the engine mount assembly shown and described in FIGS. 1 and 2.

DETAILED DESCRIPTION

Figure 1:
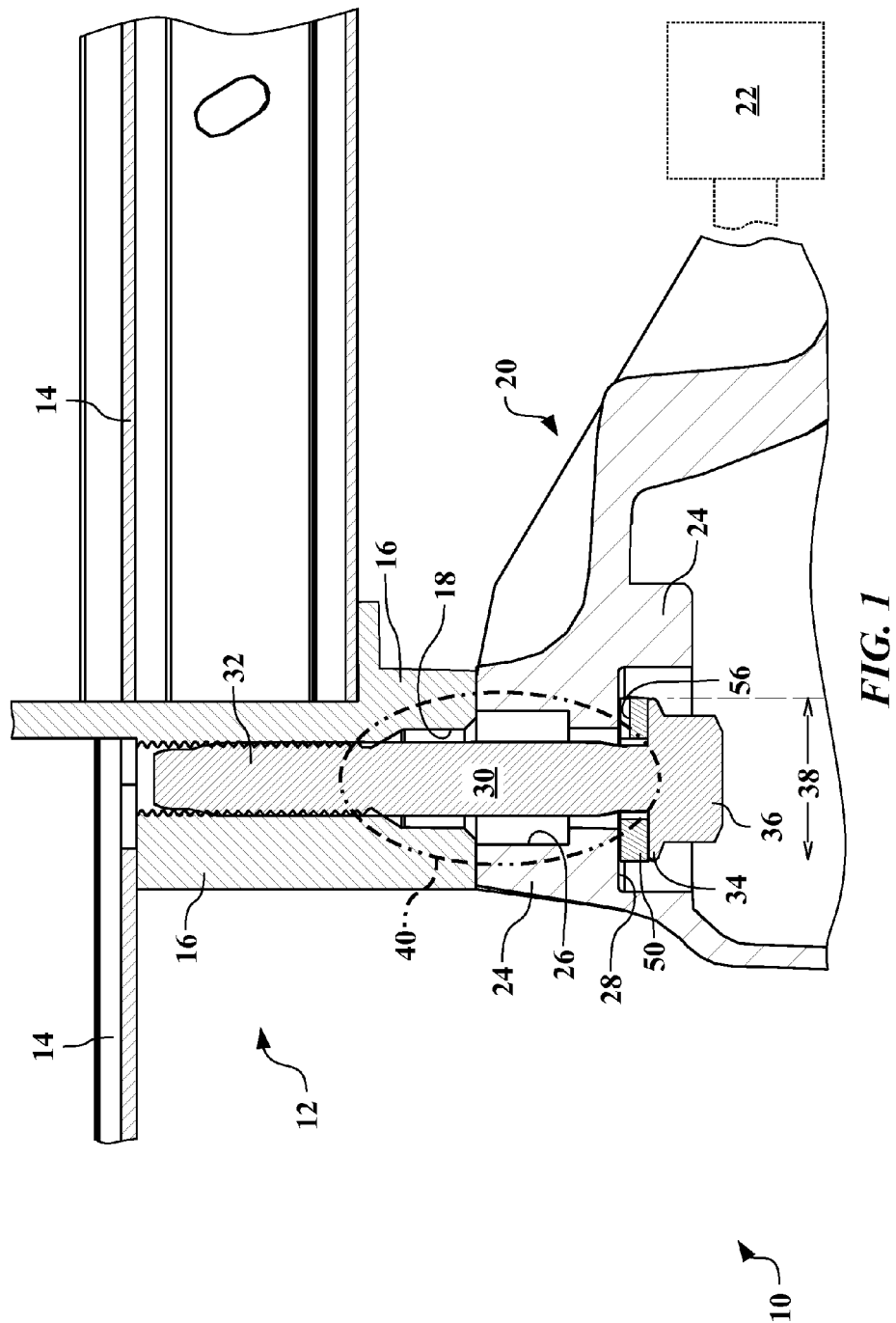
FIG. 1 is a schematic, cross-sectional view of an engine mount assembly for a vehicle, illustrating a cradle-to-frame joint.

Referring to the drawings, wherein like reference numbers correspond to like or similar components whenever possible throughout the several figures, there is shown in FIG. 1 a portion of a vehicle. In particular, FIG. 1 shows an engine mount or cradle mount assembly 10 for the vehicle. A portion of a body 12 of the assembly 10, including an underbody frame 14, is shown in FIG. 1 and broadly illustrates the structural chassis elements of the vehicle.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

A frame member or frame mount 16 is rigidly attached to the underbody frame 14. The frame mount 16 may be rigidly attached to the underbody frame 14 by, for example and without limitation: welds, adhesives, fasteners, or combinations thereof. Additionally, the frame mount 16 may be formed integrally as one piece with the underbody frame 14. The frame mount 16 defines a frame hole 18.

A cradle 20 operatively attaches an engine 22 (shown schematically) to the body 12 via the frame mount 16. The cradle 20 includes a cradle member or cradle mount 24, which defines a cradle hole 26. Upon assembly, the frame hole 18 and the cradle hole 26 are substantially coincident or aligned. The cradle mount 24 shown defines a seat 28 at its lower end, relative to gravity.

In the configuration shown, the cradle mount 24 is lower than the frame mount 16, relative to gravity, during normal vehicle use. However, in other configurations, the relative locations of the cradle mount 24 and the frame mount 16 may be switched, such that the fame mount 16 is the lower member of the two. In such a configuration, the seat 28 may be formed on the frame mount 16. As used herein, the top of the vehicle faces upward, relative to gravity, during normal operation of the vehicle on substantially flat ground, and the bottom of the vehicle faces downward (opposite the top of the vehicle).

A bolt 30 is disposed at least partially within the frame hole 18 and the cradle hole 26, and fixedly mates the frame mount 16 to the cradle mount 24. The bolt 30 has a bolt body 32 and a bolt flange 34. The bolt body 32 is oriented upward, relative to gravity, and the bolt flange 34 is oriented downward, relative to gravity. The bolt body 32 is substantially disposed within the frame hole 18 and the cradle hole 26, and the bolt flange 34 is within the seat 28 of the cradle mount 24.

The bolt 30 further includes or defines a bolt head 36, which is generally adjacent to the bolt flange 34. The bolt flange 34 has an outer perimeter or edge that defines a flange diameter 38.

A well 40 is defined by at least one of the frame hole 18 and the cradle hole 26. The general location of the well 40 is illustrated in phantom in FIG. 1. The well 40 is a contained volume or space around the bolt body 32 that is capable of retaining water in contact with the bolt body 32 and at least one of the frame mount 16 and the cradle mount 24.

Therefore, when water or moisture enters the well 40, there is no inherent escape route, such as a leak point, defined between the frame mount 16 or the cradle mount 24 and the lower portions of the well 40. Water that enters the well 40, such as through the top of the frame hole 18 or the interface between the frame mount 16 and the cradle mount 24, may be retained within the well 40 and in contact with the bolt 30. Water, or other liquids, retained within the well 40 may promote corrosion of the frame mount 16, the cradle mount 24, the bolt 30, or combinations thereof, especially in configurations using dissimilar materials.

Ingress of water may occur through, for example and without limitation, an unplugged end of either the frame hole 18 or the cradle hole 26, such as the top (as viewed in FIG. 1 and relative to gravity) of the frame hole 18, or through cracks or seams, such as the interface between the frame mount 16 and the cradle mount 24. The well 40 is below, relative to gravity and to the vehicle, any ingress of water into the well 40, such that any portion of the frame hole 18, the cradle hole 26, or both, that is capable of holding water may define the well 40. As shown in FIG. 1, a washer 50 is disposed between the bolt flange 34 and the seat 38, such that the washer 50 sits at the bottom of the well 40, relative to gravity.

Referring also to FIG. 2, FIG. 3A, and FIG. 3B, and with continued reference to FIG. 1, there are shown several isometric views of the bolt 30 and the washer 50. FIG. 2 illustrates the bolt 30 and the washer 50 as the components would be assembled in FIG. 1. FIGS. 3A and 3B show opposing sides of the washer 50.

The washer 50 has an interior hole 52 and a perimeter edge 54. At least one channel 56 is defined in at least one side of the washer 50, as best viewed in FIGS. 2 and 3A. In the assembly 10, the channel 56 provides fluid communication between the well 40 and the perimeter edge 54 of the washer 50.

Therefore, the channel 56 provides a drain or leak point to remove water from the well 40. If the channel 56 were not formed in the washer 50, liquids could be retained within the well 40 in contact with the bolt 30 and either the frame mount 16 of the cradle mount 24.

The bolt flange 34 defines the flange diameter 38, and the washer 50 defines a washer diameter 58. In the configuration shown, the washer diameter 58 and the flange diameter 38 are substantially equal. As used herein, substantially equal may refer to the washer diameter 58 being within five percent— either larger or smaller—of the flange diameter 38.

In other configurations, the washer diameter 58 may be up to, but no more than, twenty-five percent greater than the flange diameter 38. In configurations where the bolt head 36 is not differentiated from the bolt flange 34, such as hex bolts or those in which the perimeter of the flange 34 is the same width as the bolt head 36, the maximum diameter of the bolt head 36 defines the flange diameter 38.

As illustrated in FIGS. 2, 3A, and 3B, the washer 50 has at least three channels 56, such that there are at least three paths of fluid communication between the well 40 and the perimeter edge 54 of the washer 50. Each of the channels 56 spans from the interior hole 52 to the perimeter edge 54. However, as long as the channels 56 are in communication with the well 40 and the perimeter edge 54, such that water flows out of the cradle hole 26, the channels 56 may not be defined all the way to the interior hole 52.

As best viewed in FIG. 3B, the washer 50 has a planar side 60 opposite the at least three channels 56. In the configuration of the assembly 10 shown, the planar side 60 abuts the bolt flange 34. However, in some configurations, the planar side 60 may abut the seat 28, particularly where the channels 56 fully extend between the perimeter edge 54 and the interior hole 52 of the washer 50.

The at least three channels 56 are defined at a channel depth 64 into the washer 50. The channel depth 64 is between thirty to seventy percent of a washer thickness 62 of the washer 50. In order to improve the strength of the washer 50, the channel depth 64 may be limited to less than fifty percent of the washer thickness 62.

In many configurations, the frame mount 16 and the cradle mount 24 may be formed from aluminum or aluminum alloys. Aluminum construction may limit the size of the seat 28, which limits the accessible area or volume for the bolt 30 and the washer 50. In other configurations, one or both of the frame mount 16 and the cradle mount 24 may be formed from steel alloys. The bolt 30, the washer 50, or both, may be formed from other materials, such as steel, stainless steel, or other alloys of steel, or may be coated.

Referring now to FIG. 4, and with continued reference to FIGS. 1-3B, there is shown an isometric view of a two-channel washer 70. A pair of channels 76, which are on substantially-opposing sides of an inner interior hole 72, are defined to less than half the thickness of the washer 70.

The two-channel washer 70 may have improved contact surface area between the seat 28 and the two-channel washer 70, relative to the three-channel washer 50 shown in FIGS. 2-3B. However, the two-channel washer 70 has a reduced number of paths removing water from the well 40. Additionally, with the three-channel washer 50, one of the channels 56 is always oriented toward the rear of the assembly 10, away from the front tires, such that debris kicked from the tires toward the cradle mount 24 is less likely to clog or plug all of the channels 56.

Referring now to FIG. 5, and with continued reference to FIGS. 1-4, there is shown an isometric view of a stacked washer 80. As shown in FIG. 5, the stacked washer 80 includes a first washer 81 and a second washer 82.

The second washer 82 is substantially planar or solid and lacks any channel similar to the channels 56 illustrated in FIGS. 1-3B. However, a channel 86 is defined in the first washer 81. Furthermore, the channel 86 is defined through the entirety of a thickness 92 of the first washer 81, such that the channel 86 extends from the interior or inner hole to a perimeter 84 and prevents the first washer 81 from being a complete ring. In assembly, the second washer 82 may be adjacent to the bolt flange 34, such that the first washer 81 is between the second washer 82 and the seat 28 formed on one of the frame mount 16 and the cradle mount 24.

The detailed description and the drawings or figures are supportive and descriptive of the subject matter discussed herein. While some of the best modes and other embodiments for have been described in detail, various alternative designs, configurations, and embodiments exist.

The invention claimed is:
1. An engine mount assembly for a vehicle, comprising:
a frame member defining a frame hole, wherein the frame member is attached to a frame of the vehicle;
a cradle member defining a cradle hole; a well defined by at least one of the frame hole and the cradle hole, wherein the well is a volume around the bolt body and oriented such that a fluid may be retained in the well;
a bolt having a bolt body and a bolt flange, wherein the bolt body is disposed within the frame hole and the cradle hole and the bolt attaches the frame member to the cradle member;

a washer disposed between the bolt flange and the well, wherein the washer defines an interior hole and a perimeter edge; and at least one channel defined in the washer, wherein the channel provides fluid communication between the perimeter edge of the washer and one of the frame hole and the cradle hole.

2. The assembly of claim 1, wherein the channel defined in the washer provides fluid communication between the well and the perimeter edge of the washer.

3. The assembly of claim 2, wherein the bolt flange has a flange diameter, wherein the washer has a washer diameter, and wherein the washer diameter is no more than twenty-five percent greater than the flange diameter.

4. The assembly of claim 3, further comprising:

at least three channels defined in the washer, wherein each of the channels provides fluid communication between the well and the perimeter edge of the washer.

5. The assembly of claim 4, wherein the washer diameter is within five percent of the flange diameter.

6. The assembly of claim 5, wherein the washer has a planner side opposite the at least three channels, and wherein the planar side abuts the bolt flange.

7. The assembly of claim 6, wherein the at least three channels are defined at a channel depth into the washer, and wherein the channel depth is between thirty to seventy percent of a thickness of the washer.

8. The assembly of claim 7, wherein the frame member is aluminum and the cradle member is aluminum.

9. The assembly of claim 3, wherein the washer is a first washer, and further comprising:

a second washer, wherein the second washer lacks any channel, wherein the channel of the first washer is defined through the entirety of a thickness of the first washer, and wherein the second washer is adjacent the bolt flange and the first washer is between the second washer and one of the frame member and the cradle member.

10. A vehicle, comprising:

an underbody;

a frame mount attached to the underbody, wherein the frame mount is formed from aluminum;

a frame hole defined through the frame mount;

an engine;

a cradle mount formed from aluminum and operatively attached to the engine, wherein the cradle mount defines a cradle hole there through, and wherein the cradle hole is substantially aligned with the frame hole;

a bolt having a bolt body oriented upward relative to a top of the vehicle and a bolt flange oriented downward relative to a bottom of the vehicle, wherein the bolt body is disposed within the frame hole and the cradle hole, such that the bolt fixedly mates the frame mount to the cradle mount and joins the engine to the underbody;

a well defined by at least one of the frame hole and the cradle hole, wherein the well is a volume around the bolt body and oriented such that a fluid may be retained within the well in contact with the bolt body and at least one of the frame mount and the cradle mount;

a washer disposed between the bolt flange and the well, wherein the washer has an interior hole and a perimeter edge; and at least two channels defined in the washer, wherein the channels provide fluid communication between the well and the perimeter edge of the washer.

11. The vehicle of claim 10, wherein the bolt flange defines a flange diameter, wherein the washer defines a washer diameter, and wherein the washer diameter is within five percent of the flange diameter.

12. The vehicle of claim 11, wherein the channels are defined at a channel depth into the washer, and wherein the channel depth is less than fifty percent of a thickness of the washer.

\* \* \* \* \*